Nov. 20, 1962 W. G. BROSENE, JR 3,064,718
MECHANICAL BEAD BREAKER
Filed June 13, 1960 6 Sheets-Sheet 1

INVENTOR.
WILLIAM G. BROSENE, JR.
BY
J. Warren Kinney, Jr.
ATTORNEY

Nov. 20, 1962 W. G. BROSENE, JR 3,064,718
MECHANICAL BEAD BREAKER
Filed June 13, 1960 6 Sheets-Sheet 2

INVENTOR.
WILLIAM G. BROSENE, JR.
BY
J. Warren Kinney Jr.
ATTORNEY

Nov. 20, 1962 W. G. BROSENE, JR 3,064,718
MECHANICAL BEAD BREAKER
Filed June 13, 1960 6 Sheets-Sheet 3

INVENTOR.
WILLIAM G. BROSENE, JR.
BY
J. Warren Kinney Jr.
ATTORNEY

Nov. 20, 1962 W. G. BROSENE, JR 3,064,718
MECHANICAL BEAD BREAKER
Filed June 13, 1960 6 Sheets-Sheet 4

INVENTOR.
WILLIAM G. BROSENE, JR.
BY
ATTORNEY

Nov. 20, 1962 W. G. BROSENE, JR 3,064,718
MECHANICAL BEAD BREAKER
Filed June 13, 1960 6 Sheets-Sheet 5
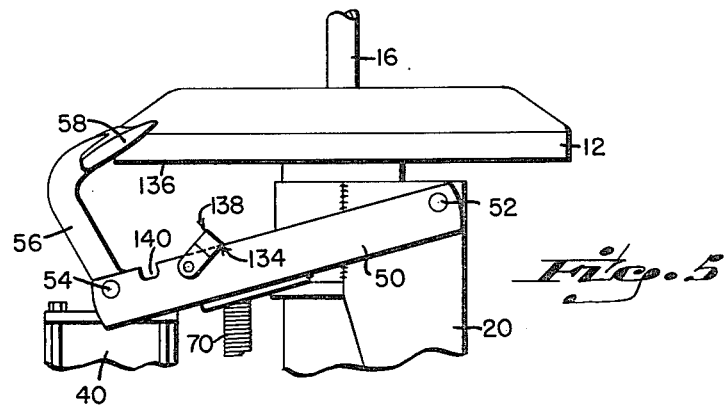
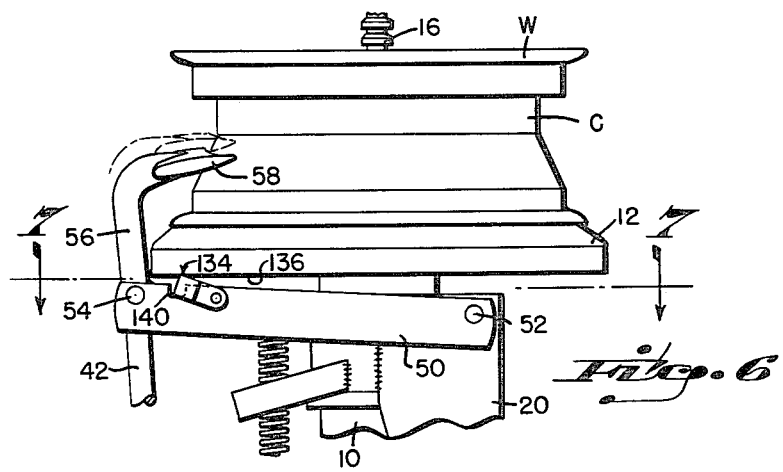
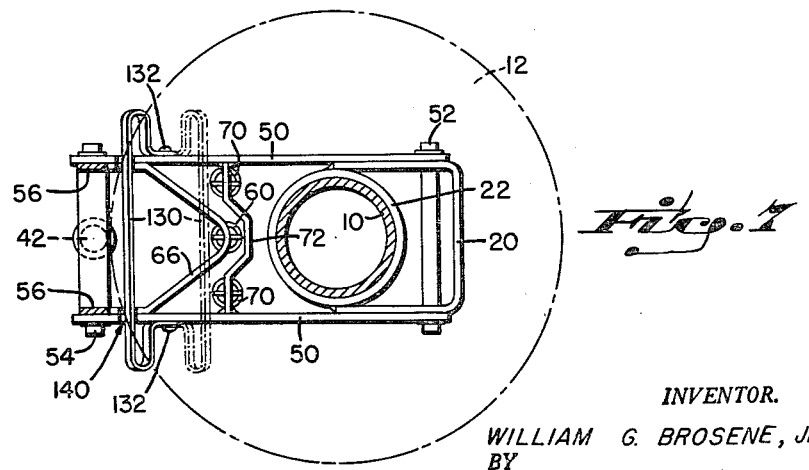
INVENTOR.
WILLIAM G. BROSENE, JR.
BY
ATTORNEY

United States Patent Office 3,064,718
Patented Nov. 20, 1962

3,064,718
MECHANICAL BEAD BREAKER
William G. Brosene, Jr., Wyoming, Ohio, assignor to Big Four Industries, Inc., Maineville, Ohio, a corporation of Ohio
Filed June 13, 1960, Ser. No. 35,816
7 Claims. (Cl. 157—1.28)

This invention relates to a device for mechanically breaking one or both beads of a pneumatic tire from the rim flange of a wheel.

An object of the invention is to provide a device for breaking the beads of a pneumatic tire from the rim flange of a wheel by means of a bead breaker jaw assembly which is power-actuated.

Another object of the invention is to provide such a device with means for selectively breaking only the lower bead of a tire, or both the upper and lower beads.

A further object of the invention is to provide novel mounting means for a power-cylinder which will effectively eliminate the transmission of binding and/or cocking forces to the cylinder and/or its extendable piston rod incident to actuation of the bead breakers.

Still another object of the invention is to provide a tire changer having the hereinabove described characteristics, in which the upper bead breaking assembly is pivotally mounted with reference to the lower end of a power cylinder for independent movement relative to the table, the lower bead breaker, and the power cylinder of the device.

A further object of the invention is to provide valving means for controlling the application of pressure media to the power cylinder, wherein said valving means are conveniently located adjacent the hand grip of a manually operable actuator lever for permitting efficient operation on the part of an operator.

Another object of the invention is the provision of simple, yet highly effective means in conjunction with the actuating lever of the lower bead breaker for controlling the amount or degree of upward travel of said bead breaker.

These and other objects are attained by the means described herein and as disclosed in the accompanying drawings, in which:

FIGS. 5 and 6 are fragmentary side elevational views of the upper portion of the machine illustrating modifications in the structural details thereof.

FIG. 7 is a sectional view taken on line 7—7 of FIG. 6.

With reference to the figures, the numerals 10 denote generally a support column, 12 a table, and 14 a base or pedestal. The table and base are suitably anchored to opposite ends of said column for providing a unitary, rigid structure.

Figure 1:
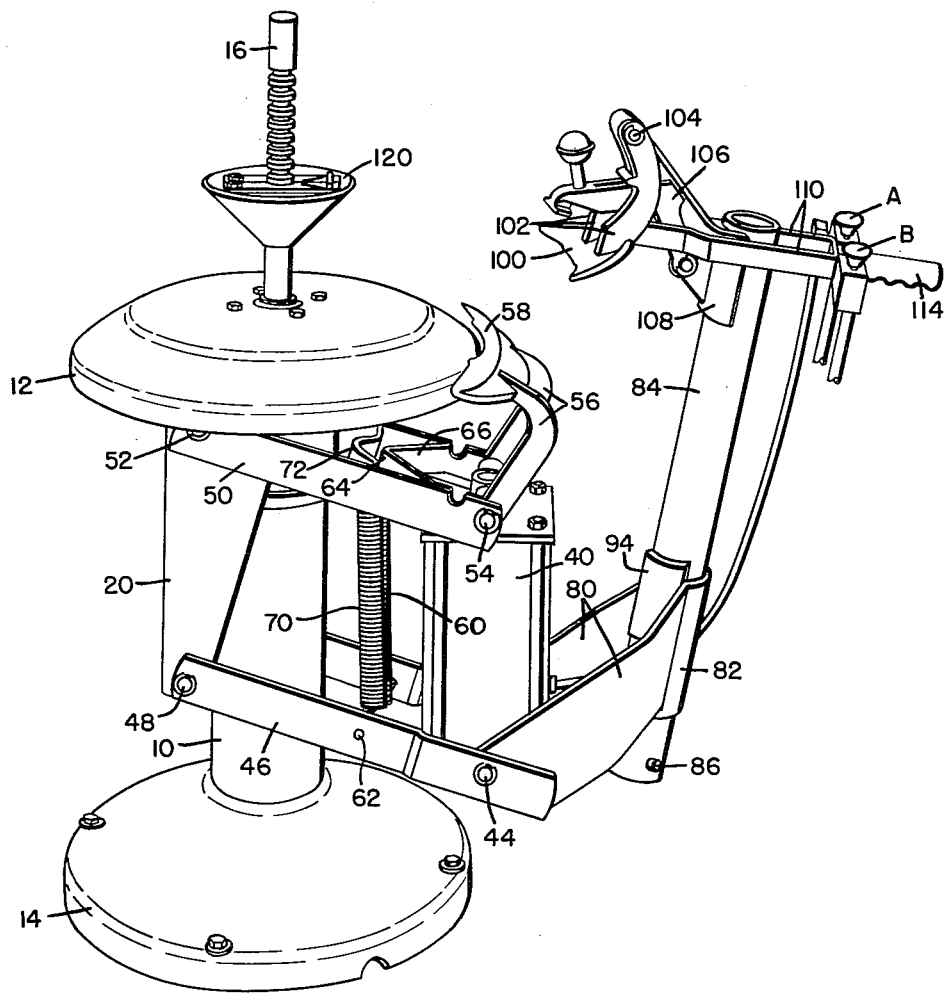
FIG. 1 is a perspective view of a bead breaking device embodying the teachings of the present invention.

A center post 16 may be provided axially of support column 10, to extend through table 12 (FIG. 1). Suitable mechanical or power-actuated means may be provided interiorly of column 10 and/or base 14 for imparting limited endwise axial movement to center post 16, however the present invention is neither directed to nor concerned with the specific structural details of the center post nor to its actuating means, but for clarity of detail and understanding reference is made to U.S. Patent No. 2,808,860, dated October 8, 1957, for a detailed description of conventional actuating means for the center post.

An elongate support member 20 is secured to and carried by column 10, such as, by way of example, by means of a collar 22 journaled on column 10 and supported thereon by retaining ring 24 suitably anchored to column 10. Collar 22 may rotate about column 10 on ring 24.

A cylinder 40 having an extensible and retractable piston rod 42 is pivotally mounted as at 44 to the forward end of the first lever means which comprises a pair of laterally spaced lower control arms 46 disposed on opposite sides of column 10. The rear end of the said first lever means is pivotally secured as at 48 to the lower portion of support member 20.

Figure 2:
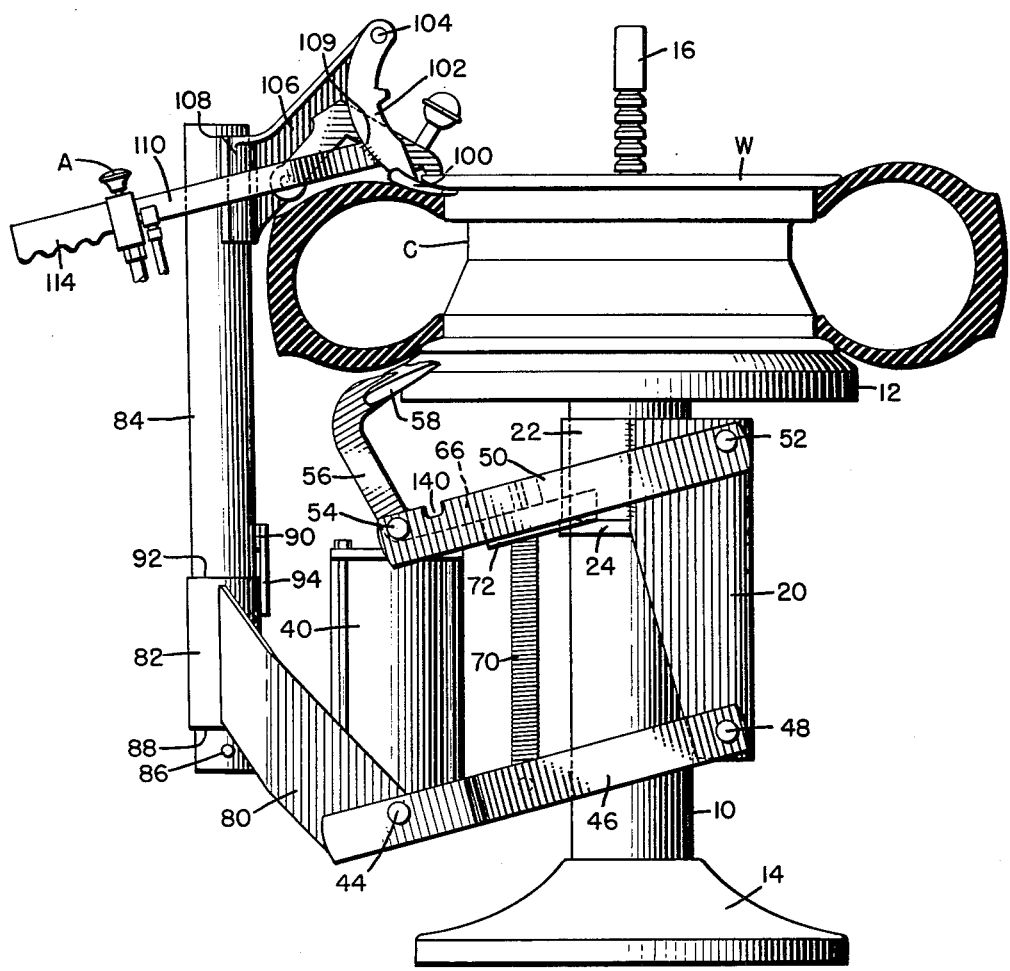
FIG. 2 is a side elevational view of the opposite side of the device of FIG. 1, showing a wheel with a tire thereon associated therewith and with the jaws of the upper and lower bead breaker positioned at the start of a bead breaking operation.

Second lever means, note FIG. 7, are provided in the form of a pair of laterally spaced upper control arms 50 the rear ends of which are pivotally mounted as at 52 to the upper portion of support member 20 wherein pivotal means 48 and 52 are disposed in spaced, axial alignment, FIG. 2.

The forward end of the second lever means is pivotally secured as at 54 to the free, lower end of the laterally spaced mounting arms 56 of a lower bead breaker 58 and to the upper end of the piston rod 42.

Figure 4:
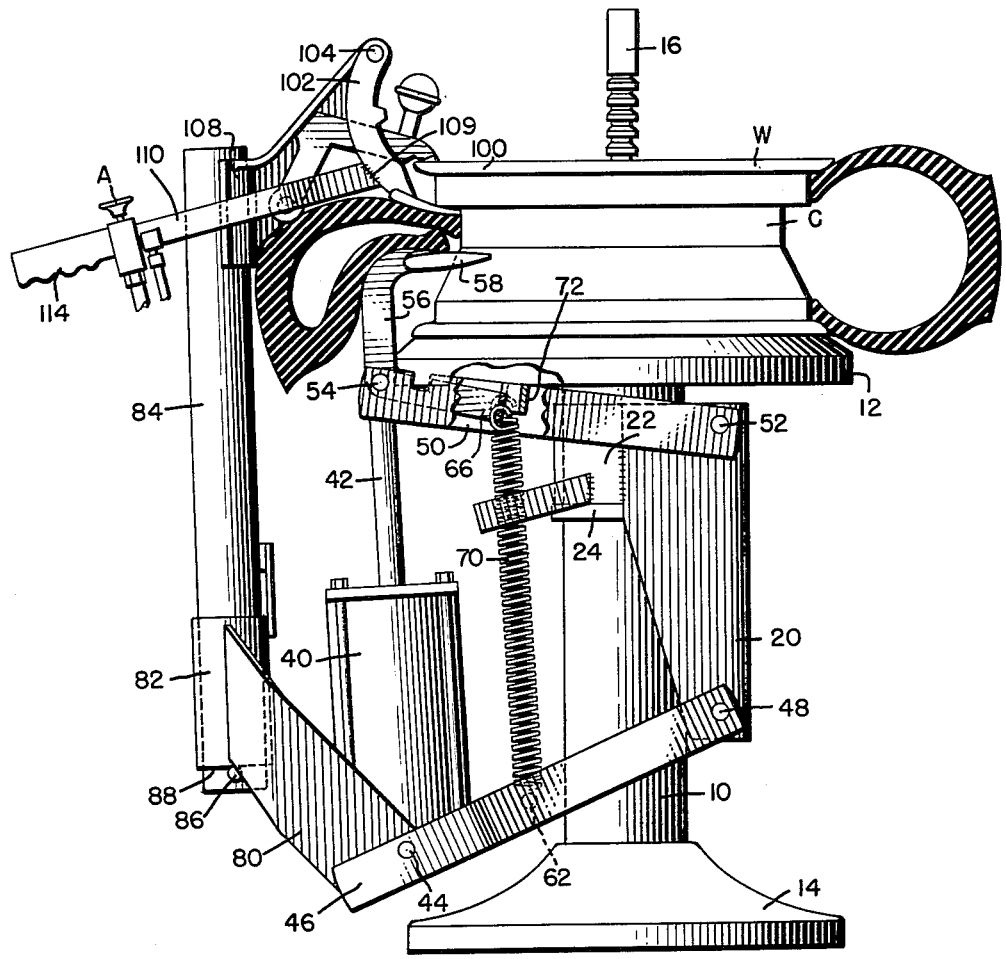

As best illustrated in FIG. 4, arms 56 are normally and yieldably urged in a clockwise direction about pivot 54 by means of a tension spring 60, the lower end of which is secured to the first lever means as at 62, the upper end of which is secured as at 64 to extension 66 of arms 56, it being understod that extension 66 is rigidly secured to and integral with the lower end of arms 56, note FIG. 1.

Other spring means 70 are interposed on opposite sides of spring 60 (FIG. 7) between first lever means as at 62 and transverse leg 72 which spans and is rigidly secured to arms 50 of the second lever means, whereby the forward ends of said first and second lever means are normally and yieldably urged together about pivotal connections 48 and 52.

The numeral 80 denotes a pair of laterally spaced brackets pivotally secured as at 44 relative to the lower end of cylinder 40 and the forward end of the first lever means 46. The other end of brackets 80 are rigidly secured to an elongated sleeve 82 in which elongate element 84 is journalled for rotary as well as endwise, axial movement. An abutment 86 secured to and carried by the lower portion of element 84 is adapted to engage lower edge 88 of sleeve 82 for limiting the upward movement of element 84 relative to the sleeve. A second abutment 90 is secured to and carried by elongate element 84 at a location above upper edge 92 of sleeve 82 for limiting the downward relative movement of said element with reference to the sleeve.

Depending member 94 is provided for engagement with the inner faces of brackets 80 for limiting the degree by which element 84 may be rotated relative to sleeve 82.

The numeral 100 denotes generally an upper bead breaker having a mounting arm 102 pivotally secured as at 104 to an arm 106 which is fixedly secured as at 108 to the upper end of element 84. The upper bead breaker is adapted to be manually moved about pivotal connection 104 by means of an actuator lever 110 suitably secured as at 109 to a portion of mounting arms 102, it being noted that movement of actuator lever toward center post 16 will urge the upper bead breaker inwardly toward the axis of said center post, and, conversely, movement of the actuator lever in the opposite direction will result in swinging the upper bead breaker about pivotal connection 104 away from the axis of center post 16. A hand grip portion 114 is provided adjacent the free outer end of actuator lever 110 for facilitating gripping thereof by an operator.

As best illustrated in FIG. 1, a pair of valving elements having push buttons A and B are mounted to, adjacent, and on opposite sides of hand grip portion 114 of the actuator lever assembly 110 whereby said buttons are easily accessible to, being disposed under, the thumb of an operator's hand holding hand grip portion 114. One of said valving means such as, by way of example, the one associated with button A, may be utilized to control the flow of a pressure media to means within column 10 and/or base 14 for imparting endwise axial movement to center post 16. The valve associated with control button B may be utilized to control the flow of pressure media to cylinder 40 for effecting extension of piston 42 therefrom in opposition to the counter force of springs 70.

Figure 3:
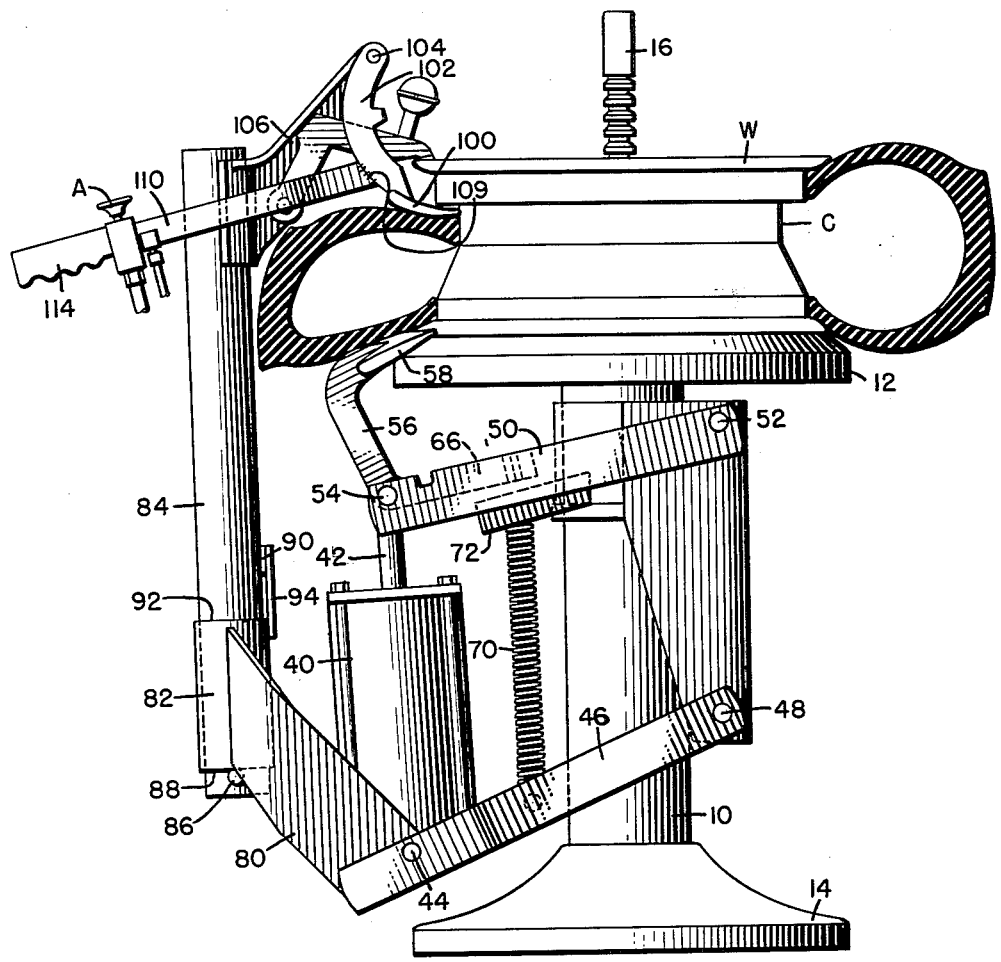
FIGS. 3 and 4 are views similar to FIG. 2 showing successive steps in a double bead-breaking operation.

In operation of the device, the combination centering and locking cone denoted generally by the numeral 120 of FIG. 1 is removed from center post 16, after which a wheel is disposed upon table 12. The combination locking cone and centering device 120 is then re-associated with center post 16, after which the entire center post assembly, including the combination locking cone and centering device, is urged downwardly for securely though releasably anchoring the wheel onto the top of table 12. It will be understood that during those periods of time when a wheel is being associated with table 12, element 84 may be swung in a counter-clockwise direction, to the left, about pivot 44, to a non-interfering position. Then, after the wheel assembly has been anchored to table 12, element 84 may be moved in a clockwise direction about pivot 44 toward center post 16 and the upper bead breaker 100 manipulated via actuator lever 110 whereby to assume the position illustrated in FIG. 2. It will be noted that the lower bead breaker 58 is normally disposed in the position illustrated in FIG. 2; thus with the upper and lower bead breakers thus positioned, the introduction of pressure media into cylinder 40 will result in extension of piston rod 42 which will force the forward ends of the first and second lever means 46 and 50 apart with the result that the lower bead breaker 58 will be elevated and the upper bead breaker 100 will be lowered relative to the table for automatically effecting the sequential bead breaking steps illustrated in FIGS. 3 and 4.

In this connection it will be noted that element 84, when positioned as in FIG. 2, will not be urged downwardly until such time as abutment 86 engages lower edge 88 of sleeve 82, after which a lowering or counter-clockwise movement of the first lever means will result in lowering of the entire upper bead breaker assembly concurrently with elevating of the lower bead breaker.

After the beads of the tire casing have been thus introduced into well C of wheel W, the pressure media may be released from cylinder 40, whereupon the first and second lever means will be restored to their initial positions illustrated in FIG. 2 by reason of springs 70.

Figure 8:
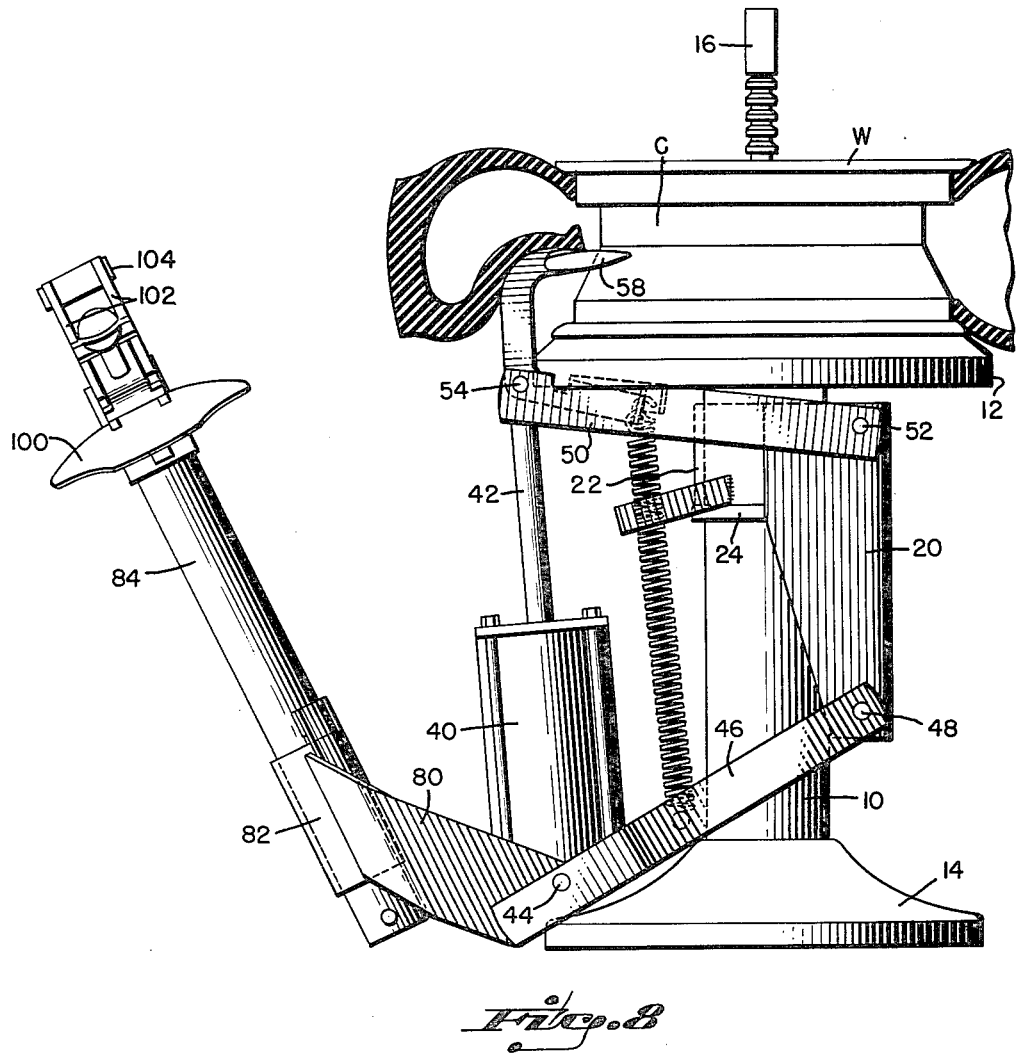
FIG. 8 is a side elevational view of the device illustrating the manner in which it may be utilized for breaking only the lower bead from the rim flange of a wheel.

With particular reference to FIG. 8, it will be noted that the upper bead breaking assembly may be swung outwardly away from the wheel in order that only the lower bead breaker will be operative incident to extension of piston rod 42 from cylinder 40. The upper or second lever means 50 will be swung upwardly for elevating the lower bead breaker 58 incident to lowering of the lower or first lever means 46 against a stop such as, by way of example, base 14.

As illustrated in FIGS. 5, 6 and 7, a latch bar 130 having ends pivotally secured as at 132 to arms 50 of the upper or second lever means is adapted to be disposed in the rearward, inoperative position of FIG. 5, indicated in broken outline on FIG. 7, or in the forward, operative position of FIGS. 6 and 7 with its upper edge 134 arranged to abuttingly engage lower edge 136 of table 12 when its lower edge 138 is seated within notches 140 in the upper surface of arms 50.

In this manner I have provided simple yet highly effective means for decreasing the upward stroke of the lower bead breaker while simultaneously increasing the downward stroke of the upper bead breaker.

What is claimed is:

1. A device for breaking the bead of a pneumatic tire from the rim flange of a wheel, comprising a support column, a wheel supporting table, a base, said table and base secured to opposite ends of said column, a support member secured to and carried by said column, a bead breaker including a mounting arm, a cylinder including an extensible and retractable piston rod, first lever means having opposite ends pivoted respectively to said support member and to that end of said cylinder remote from said piston rod, second lever means having opposite ends pivoted respectively to said support member and to the free ends of said piston rod and bead breaker mounting arm, whereby those ends of said lever means remote from said support member will be forced apart and said bead breaker elevated relative to said table incident to extension of said piston rod from said cylinder, and another bead breaker, elongate means carrying said another bead breaker, bracket means, said elongate means being rotatably journalled in said bracket means for selectively disconnecting said another bead breaker from operative position, said bracket means being pivotally connected to the end of said first lever means pivoted to said cylinder.

2. A device for breaking the bead of a pneumatic tire from the rim flange of a wheel, comprising a support column, a wheel supporting table, a base, said table and base secured to opposite ends of said column, a support member secured to and carried by said column, a bead breaker including a mounting arm, a cylinder including an extensible and retractable piston rod, first lever means having ends on opposite sides of said column pivoted respectively to said support member on one side of said column and on the other side of said column to that end of said cylinder remote from said piston rod, second lever means having ends on opposite sides of said column pivoted respectively to said support member on one side of said column and on the other side of said column to the free ends of said piston rod and bead breaker mounting arm, whereby those ends of said lever means remote from said support member will be forced apart and said bead breaker elevated relative to said table incident to extension of said piston rod from said cylinder, and another bead breaker, elongate means carrying said another bead breaker, bracket means, said elongate means being rotatably journalled in said bracket means for selectively disconnecting said another bead breaker from operative connected to the end of said first lever means pivoted to said cylinder.

3. A device for breaking the upper and lower beads of a pneumatic tire from the rim flanges of a wheel, comprising a support column, a wheel supporting table, a base, said table and base secured to opposite ends of said column, a support member secured to and carried by said column, upper and lower bead breakers, an elongate element, means mounting said upper bead breaker adjacent the upper end of said element for pivotal movement about a horizontal axis, a cylinder including an extensible and retractable piston rod, first lever means having one end pivoted to said support member and the other end pivoted to that end of said cylinder remote from said piston rod and also pivoted to the lower end of said elongate element, second lever means having one end pivoted to said support member and the other end pivoted to the free end of said piston rod and also pivoted to said lower bead breaker whereby those ends of said lever means remote from said support member will be forced apart and said lower bead breaker elevated relative to said table and said upper bead breaker lowered relative to said table incident to extension of said piston rod from said cylinder.

4. A device for breaking the upper and lower beads of a pneumatic tire from the rim flanges of a wheel, comprising a support column, a wheel supporting table, a base, said table and base secured to opposite ends of said column, an elongate support member secured to and carried by said column, upper and lower bead breakers, an elongate element, means mounting said upper bead breaker adjacent the upper end of said element for pivotal movement about a horizontal axis, a cylinder including an extensible and retractable piston rod, first lever means having one end pivoted to said support member on one side of said column and the other end pivoted at the other side of said column to said cylinder and also to the lower end of said elongate element, second lever means having one end pivoted to said support member on one side of said column above and in vertical alignment with the pivotal connection of said first lever means with said support member and the other end pivoted at the other side of said column to said piston rod and also to said lower bead breaker, whereby those ends of said lever means remote from said support member will be forced apart and said lower bead breaker elevated and said upper bead breaker lowered relative to said table incident to extension of said piston rod from said cylinder.

5. A device for breaking the upper and lower beads of a pneumatic tire from the rim flanges of a wheel, comprising a support column, a wheel supporting table, a base, said table and base secured to opposite ends of said column, a support member secured to and carried by said column, upper and lower bead breakers, a bracket, an elongate element, means securing the lower end of said element to said bracket, means mounting said upper bead breaker adjacent the upper end of said element for pivotal movement about a horizontal axis, a cylinder including an extensible and retractable piston rod, first lever means having one end pivoted to said support member and the other end pivoted to that end of said cylinder remote from said piston rod and also pivoted to said bracket, second lever means having one end pivoted to said support member and the other end pivoted to the free end of said piston rod and also pivoted to said lower bead breaker, said elongate element being movable about said bracket pivot independently of and relative to said cylinder and piston rod, and means controlling the flow of pressure media to said cylinder.

6. A device for breaking the upper and lower beads of a pneumatic tire from the rim flanges of a wheel, comprising a support column, a wheel supporting table, a base, said table and base secured to opposite ends of said column, a support member secured to and carried by said column, upper and lower bead breakers, a bracket, an elongate element, means journaling the lower portion of said element to said bracket for limited axial and rotational movement therewith, means mounting said upper bead breaker adjacent the upper end of said elongate element for pivotal movement about a horizontal axis, a cylinder including an extensible and retractable piston rod, first lever means remote from said table having one end pivoted to said support member and the other end secured by a common pivotal connection to that end of said cylinder remote from said piston rod and to said bracket, second lever means adjacent said table having one end pivoted to said support member and the other end secured by a common pivotal connection to the free end of said piston rod and to said lower bead breaker, said elongate element being movable about said first common pivotal connection independently of and relative to said cylinder and piston rod.

7. A device for breaking the upper and lower beads of a pneumatic tire from the rim flanges of a wheel, comprising a support column, a wheel supporting table, a base, said table and base secured to opposite ends of said column, a support member secured to and carried by said column, upper and lower bead breakers, an elongate element, means mounting said upper bead breaker on the upper end of said element, a cylinder including an extensible and retractable piston rod, first lever means having one end pivoted to said support member and the other end secured by a common pivotal connection to that end of said cylinder remote from said piston rod and the lower end of said elongate element, second lever means having one end pivoted to said support member and the other end secured by a common pivotal connection relative to the free end of said piston rod and said lower bead breaker, whereby those ends of said lever means remote from said support member will be forced apart and said lower bead breaker elevated and said upper bead breaker lowered relative to said table incident to extension of said piston rod from said cylinder, and adjustable means secured to and carried by said second lever means for selectively decreasing by limiting the upward travel of said lever means while simultaneously increasing the downward travel of said first lever means.

References Cited in the file of this patent

UNITED STATES PATENTS

| | | |
|---|---|---|
| 2,413,010 | Teegarden | Dec. 24, 1946 |
| 2,609,038 | Henderson | Sept. 2, 1952 |
| 2,749,975 | Curtis | June 12, 1956 |
| 2,818,108 | Wells | Dec. 31, 1957 |
| 2,844,194 | Marshall | July 22, 1958 |